United States Patent
Xu et al.

(10) Patent No.: US 12,356,310 B2
(45) Date of Patent: Jul. 8, 2025

(54) TRANSFERRING TRAFFIC IN INTEGRATED ACCESS AND BACKHAUL COMMUNICATION

(71) Applicant: Nokia Solutions and Networks Oy, Espoo (FI)

(72) Inventors: Xiang Xu, Nanjing (CN); Henri Koskinen, Espoo (FI); Matti Laitila, Oulu (FI); Esa Malkamäki, Espoo (FI); Osman Yilmaz, Espoo (FI); Oliver Blume, Stuttgart (FI); Ilkka Keskitalo, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 385 days.

(21) Appl. No.: 18/042,112

(22) PCT Filed: Oct. 22, 2020

(86) PCT No.: PCT/CN2020/122998
§ 371 (c)(1),
(2) Date: Feb. 17, 2023

(87) PCT Pub. No.: WO2022/082671
PCT Pub. Date: Apr. 28, 2022

(65) Prior Publication Data
US 2023/0328625 A1    Oct. 12, 2023

(51) Int. Cl.
*H04W 40/22* (2009.01)

(52) U.S. Cl.
CPC .................. *H04W 40/22* (2013.01)

(58) Field of Classification Search
CPC ............. H04W 40/22; H04W 36/0033; H04W 36/0055; H04W 36/08; H04W 36/0005
See application file for complete search history.

(56) References Cited

U.S. PATENT DOCUMENTS

2020/0146109 A1   5/2020  Majmundar et al.
2020/0351854 A1*  11/2020 Wang ................. H04W 76/12
(Continued)

FOREIGN PATENT DOCUMENTS

CA       3109180 A1    10/2019
CN     110351765 A     10/2019
(Continued)

OTHER PUBLICATIONS

"3rd Generation Partnership Project; Technical Specification Group Radio Access Network; NG-RAN; Architecture description (Release 16)", 3GPP TS 38.401, V16.3.0, Sep. 2020, pp. 1-78.
(Continued)

*Primary Examiner* — Hashim S Bhatti
(74) *Attorney, Agent, or Firm* — Nokia Solutions and Networks Oy

(57) ABSTRACT

Embodiments of the present disclosure relate to devices, methods, apparatuses and computer readable storage media for transferring traffic in integrated access and backhaul (IAB) communication. According to embodiments of the present disclosure, a first Central Unit-Control Plane (CU-CP) of a first IAB donor transmits, to a second CU-CP of a second IAB donor, a request to transfer target traffic via a Distributed Unit (DU) of the second IAB donor. The request comprises first information of the target traffic. The first CU-CP receives, from the second CU-CP, second information to be used for configuring the target traffic. This solution can improve the reliability and robustness of the IAB communication.

15 Claims, 8 Drawing Sheets

(56) References Cited

U.S. PATENT DOCUMENTS

| | | | |
|---|---|---|---|
| 2021/0099385 A1 | | 4/2021 | Huang et al. |
| 2022/0279552 A1* | | 9/2022 | Teyeb ................... H04W 40/22 |
| 2023/0239940 A1* | | 7/2023 | Luo ................... H04B 7/15528 |
| | | | 370/329 |

FOREIGN PATENT DOCUMENTS

| | | |
|---|---|---|
| CN | 110519206 A | 11/2019 |
| CN | 110649997 A | 1/2020 |
| CN | 110740485 A | 1/2020 |
| CN | 111093286 A | 5/2020 |
| CN | 111586784 A | 8/2020 |
| WO | 2019/139524 A1 | 7/2019 |
| WO | 2019/214747 A1 | 11/2019 |
| WO | 2019/216717 A1 | 11/2019 |
| WO | 2019/246248 A1 | 12/2019 |
| WO | 2019/246446 A1 | 12/2019 |
| WO | 2020/039400 A1 | 2/2020 |
| WO | 2020/073196 A1 | 4/2020 |
| WO | 2020/166912 A1 | 8/2020 |
| WO | 2021/030997 A1 | 2/2021 |

OTHER PUBLICATIONS

"3rd Generation Partnership Project; Technical Specification Group Radio Access Network; NG-RAN; F1 application protocol (F1AP) (Release 16)", 3GPP TS 38.473, V16.3.0, Sep. 2020, pp. 1-455.

"3rd Generation Partnership Project; Technical Specification Group Radio Access Network; NR; Study on Integrated Access and Backhaul; (Release 16)", 3GPP TR 38.874, V16.0.0, Dec. 2018, pp. 1-111.

"Inter-donor IAB-node Migration", 3GPP TSG-RAN WG3 Meeting #109-e, R3-204795, Agenda Item: 13.2.1, Qualcomm Incorporated, Aug. 17-28, 2020, pp. 1-5.

"Scenarios of topology adaptation for IAB network", 3GPP TSG-RAN WG2 #111e, R2-2007660, Agenda Item: 8.4.2, Ericsson, Aug. 17-28, 2020, pp. 1-5.

"IEEE 802.11", Wikipedia, Retrieved on Feb. 14, 2023, Webpage available at : https://en.wikipedia.org/wiki/IEEE_802.11.

International Search Report and Written Opinion received for corresponding Patent Cooperation Treaty Application No. PCT/CN2020/122998, dated Jun. 29, 2021, 9 pages.

"Summary of Offline Discussion on IAB node migration", 3GPP TSG-RAN WG3 #107bis-e, R3-202483, Agenda Item: 13.3.2, ZTE, Apr. 20-30, 2020, 15 pages.

"Further Discussion on IP traffic mapping configuration for intra-donor transmission", 3GPP TSG-RAN WG3 Meeting #105bis, R3-194987, Agenda Item: 13.2.1.2, Samsung, Oct. 14-18, 2019, 3 pages.

Partial European Search Report received for corresponding European Patent Application No. 20958253.5, dated May 31, 2023, 15 pages.

Extended European Search Report received for corresponding European Patent Application No. 20958253.5, dated Aug. 31, 2023, 15 pages.

Office action received for corresponding Chinese Patent Application No. 202080022458.0, dated Mar. 14, 2024, 8 pages of office action and no page of translation available.

Office action received for corresponding Indian Patent Application No. 202347034492, dated Mar. 18, 2024, 6 pages.

Office action received for corresponding Japanese Patent Application No. 2023-521850, dated Apr. 16, 2024, 4 pages of office action and 2 pages of summary translation available.

"Summary of Offline Discussion on CB: # 8 Topology Redundancy", 3GPP TSG-RAN WG3 #108-e, R3-205468, Agenda Item: 13.2.3, Nokia, Jun. 1-11, 2020, 18 pages.

Notice of Allowance received for corresponding Chinese Patent Application No. 202080022458.0, dated Sep. 27, 2024, 4 pages of Notice of Allowance and no pages of translation available.

"(TP for Nr_IAB BL CR for TS38.401): IAB topology update", 3GPP TSG-RAN WG3 Meeting #108-e, R3-204251, Agenda item: 13.3.2.2, Huawei, Jun. 1-11, 2020, 9 Pages.

Notice of Allowance received for corresponding European Patent Application No. 20958253.5, dated Oct. 7, 2024 7 pages.

* cited by examiner

TRANSFERRING TRAFFIC IN INTEGRATED ACCESS AND BACKHAUL COMMUNICATION

RELATED APPLICATION

This application was originally filed as PCT Application No. PCT/CN2020/122998, filed on Oct. 22, 2020, which is incorporated herein by reference in its entirety.

TECHNICAL FIELD

Embodiments of the present disclosure generally relate to the field of telecommunications, and in particular, to devices, methods, apparatuses and computer readable media for transferring traffic in integrated access and backhaul (IAB) communication.

BACKGROUND

IAB has been introduced in Release 16 (Rel-16) of 3GPP specifications as a key enabler for fast and cost-efficient deployments. IAB nodes use the same or different spectrum and air interface for access and backhaul, creating a hierarchical wireless multi-hop (multiple backhaul links) network between sites. The hops eventually terminate at an IAB donor that is connected by means of a conventional fixed backhaul to the core network. An IAB node contains a mobile termination (MT) part that acts as user equipment (UE) towards its parent distributed unit (DU), and a DU part that acts as a base station towards the mobile terminal and/or the child IAB node. An IAB donor contains a central unit (CU) part and a DU part. An IAB DU can provide one or more cells to serve UEs.

Due to possible failures on the backhaul (BH) connections or changes in the IAB topology or IAB mobility, an IAB node may need to change its serving node which can be under the same or different IAB donor(s). In the latter case, a procedure of handover and connection to a new IAB donor is time consuming. This may result in an interruption of connections and services at the UEs connected to the IAB node.

SUMMARY

In general, example embodiments of the present disclosure provide devices, methods, apparatuses and computer readable media for transferring traffic in IAB communication.

In a first aspect, there is provided a method. The method comprises transmitting, at a first Central Unit-Control Plane (CU-CP) of a first Integrated Access and Backhaul (IAB) donor to a second CU-CP of a second IAB donor, a request to transfer target traffic via a Distributed Unit (DU) of the second IAB donor, the request comprising first information of the target traffic; and receiving, from the second CU-CP, second information to be used for configuring the target traffic.

In a second aspect, there is provided a method. The method comprises receiving, at a second Central Unit-Control Plane (CU-CP) of a second Integrated Access and Backhaul (IAB) donor from a first CU-CP of a first IAB donor, a request to transfer target traffic via a Distributed Unit (DU) of the second IAB donor, the request comprising first information of the target traffic; determining, based on the first information, second information to be used for the target traffic; and transmitting the second information to the first CU-CP.

In a third aspect, there is provided a method. The method comprises receiving, at a Central Unit-User Plane (CU-UP) of a first Integrated Access and Backhaul (IAB) donor from a first Central Unit-Control Plane (CU-CP) of the first IAB donor, fourth information for updating quality of service mapping information for user plane traffic of an interface between the CU-UP and an IAB node, the user plane traffic to be transferred to the JAB node; and transmitting, to the IAB node via a distributed Unit (DU) of the first IAB donor or a second IAB donor, the user plane traffic comprising at least part of the fourth information.

In a fourth aspect, there is provided a first device. The first device comprises at least one processor; and at least one memory including computer program code; where the at least one memory and the computer program code are configured to, with the at least one processor, cause the first device to transmit, at a first Central Unit-Control Plane (CU-CP) of a first Integrated Access and Backhaul (IAB) donor to a second CU-CP of a second IAB donor, a request to transfer target traffic via a Distributed Unit (DU) of the second IAB donor, the request comprising first information of the target traffic; and receive, from the second CU-CP, second information to be used for configuring the target traffic.

In a fifth aspect, there is provided a second device. The second device comprises at least one processor; and at least one memory including computer program code; where the at least one memory and the computer program code are configured to, with the at least one processor, cause the second device to receive, at a second Central Unit-Control Plane (CU-CP) of a second Integrated Access and Backhaul (IAB) from a first CU-CP of a first IAB donor, a request to transfer target traffic via a Distributed Unit (DU) of the second IAB donor, the request comprising first information of the target traffic; determine, based on the first information, second information to be used for the target traffic; and transmit the second information to the first CU-CP.

In a sixth aspect, there is provided a third device. The third device comprises at least one processor; and at least one memory including computer program code; where the at least one memory and the computer program code are configured to, with the at least one processor, cause the third device to receive, at a Central Unit-User Plane (CU-UP) of a first Integrated Access and Backhaul (JAB) donor from a first Central Unit-Control Plane (CU-CP) of the first IAB donor, fourth information for updating quality of service mapping information for user plane traffic of an interface between the CU-UP and an JAB node, the user plane traffic to be transferred to the JAB node; and transmit, to the JAB node via a distributed Unit (DU) of the first IAB donor or a second IAB donor, the user plane traffic comprising at least part of the fourth information.

In a seventh aspect, there is provided a first apparatus. The first apparatus comprises means for transmitting, at a first Central Unit-Control Plane (CU-CP) of a first Integrated Access and Backhaul (JAB) donor to a second CU-CP of a second IAB donor, a request to transfer target traffic via a Distributed Unit (DU) of the second IAB donor, the request comprising first information of the target traffic; and means for receiving, from the second CU-CP, second information to be used for configuring the target traffic.

In an eighth aspect, there is provided a second apparatus. The second apparatus comprises means for receiving, at a second Central Unit-Control Plane (CU-CP) of a second Integrated Access and Backhaul (JAB) donor from a first CU-CP of a first IAB donor, a request to transfer target traffic via a Distributed Unit (DU) of the second IAB donor, the request comprising first information of the target traffic; means for determining, based on the first information, second information to be used for the target traffic; and means for transmitting the second information to the first CU-CP.

In a ninth aspect, there is provided a third apparatus. The third apparatus comprises means for receiving, at a Central Unit-User Plane (CU-UP) of a first Integrated Access and Backhaul (JAB) donor from a first Central Unit-Control Plane (CU-CP) of the first IAB donor, fourth information for updating quality of service mapping information for user plane traffic of an interface between the CU-UP and an JAB node, the user plane traffic to be transferred to the IAB node; and means for transmitting, to the IAB node via a distributed Unit (DU) of the first IAB donor or a second IAB donor, the user plane traffic comprising at least part of the fourth information.

In a tenth aspect, there is a computer readable storage medium comprising program instructions stored thereon. The instructions, when executed by an apparatus, cause the apparatus to perform the method according to the above first, second or third aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some example embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
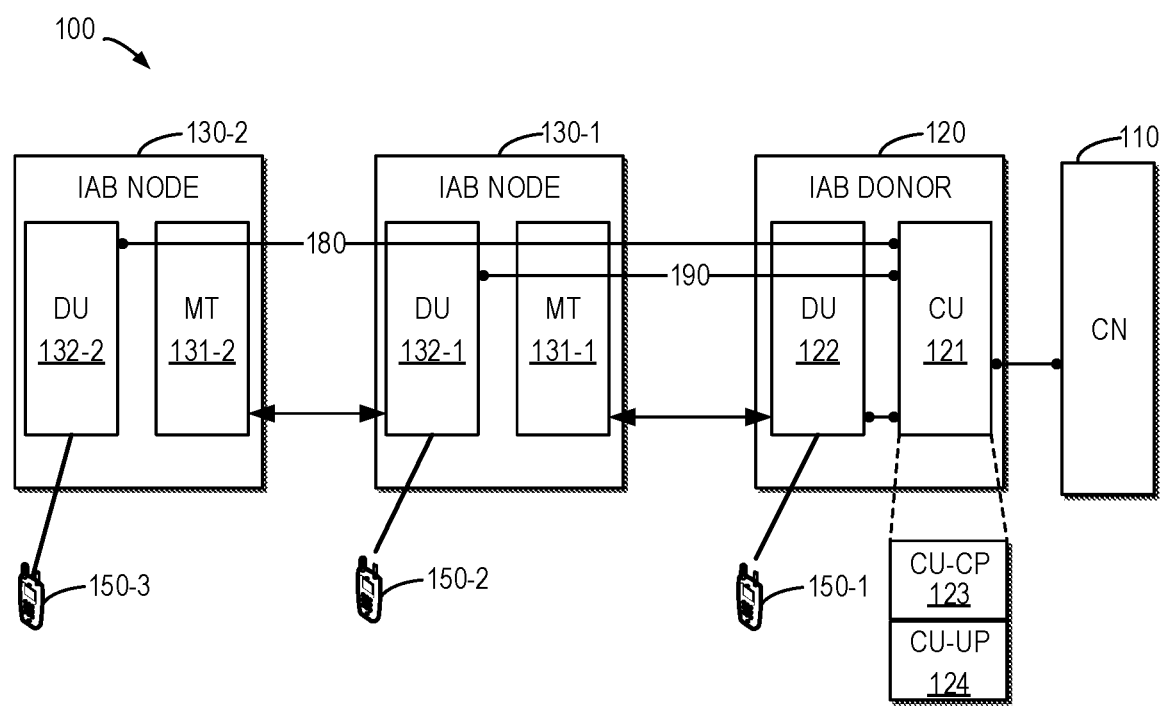
FIG. 1 illustrates a block diagram of a system for IAB communication.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
  (a) hardware-only circuit implementations (such as implementations in only analog and/or digital circuitry) and
  (b) combinations of hardware circuits and software, such as (as applicable):
    (i) a combination of analog and/or digital hardware circuit(s) with software/firmware and
    (ii) any portions of hardware processor(s) with software (including digital signal processor(s)), software, and memory(ies) that work together to cause an apparatus, such as a mobile phone or server, to perform various functions) and
  (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT), New Radio (NR) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology. Also, an IAB-node or IAB-DU is an example of network device. In the following description, the terms "network device", "BS", and "node" may be used interchangeably.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

Example embodiments of the present disclosure are directed to a radio access network with wireless backhaul of the access points. The backhaul can be multi-hop or meshed. An important application of embodiments of the present disclosure is for JAB communication in a 3GPP JAB network with terminal devices, JAB nodes and wired IAB donor nodes. In the following, embodiments of the present disclosure will be described with reference to the 3GPP JAB network. It is to be understood that embodiments of the present disclosure may also be applied to any other network with wireless backhaul.

FIG. 1 illustrates a block diagram of a system 100 for JAB communication. As shown in FIG. 1, the system 100 comprises a core network (CN) 110, an IAB donor 120, JAB nodes 130-1 and 130-2 (collectively referred to as "JAB nodes 130" or individually referred to as "JAB node 130"), and terminal devices 150-1, 150-2 and 150-3 (collectively referred to as "terminal devices 150" or individually referred to as "terminal device 150"). As used herein, the terms "JAB node" and "JAB device" can be used interchangeably. The terms "IAB donor node", "IAB donor" and "IAB donor device" can be used interchangeably.

In the architecture as shown in FIG. 1, the CN interfaces are terminated at the IAB donor 120 and therefore the relaying is only radio access network (RAN) functionality. The architecture leverages a split gNB architecture for the CU and DU so that the CU functions are at the IAB donor 120 and the DU function is at the IAB donor DU 122 or at the JAB node 130. For the connection setup and communication with the parent node (which can be another JAB node or the IAB donor), the JAB node 130 hosts the MT function corresponding to UE operation or a part of the UE operation.

The IAB donor 120 may comprise a CU 121 (also referred to as "IAB donor CU 121") and a DU 122 (also referred to as "IAB donor DU 122"). It is to be understood that the CU 121 and DU 122 may be implemented in the same device, or in different devices. The CU 121 may further comprise a CU-Control Plane (CU-CP) 123, and one or more CU-User Plane (CU-UP) 124. It is to be understood that the CU-CP 123 and CU-UP 124 may be implemented in the same device, or in different devices. The JAB node 130-1 may comprise a MT part 131-1 and a DU 132-1. The JAB node 130-2 may comprise a MT part 131-2 and a DU 132-2. The MT parts 131-1 and 131-2 are also collectively referred to as "JAB MTs 131" or individually referred to as "JAB MT 131". The DUs 132-1 and 132-2 are also collectively referred to as "JAB DUs 132" or individually referred to as "JAB DU 132".

The IAB donor DU 122 or each JAB DU 132 can provide one or more cells to serve terminal devices and/or one or more IAB-MTs 131. For example, as shown in FIG. 1, the IAB donor DU 122 serves the terminal device 150-1, the JAB DU 132-1 serves the terminal device 150-2 and the JAB DU 132-2 serves the terminal device 150-3.

The JAB MT 131 of an JAB node 130 may act as a UE towards its parent node. For example, the JAB MT 131-1 may act as a UE towards the IAB donor 120 (i.e., the IAB donor DU 122) and the JAB MT 131-2 may act as a UE towards the JAB node 130-1 (i.e., the JAB DU 132-1). On the child links, the JAB DU 132 of an JAB node 130 may act as a network device (such as, gNB) towards its next-hop JAB node. For example, the IAB donor DU 122 may act as a gNB towards the JAB node 130-1 and the JAB DU 132-1 may act as a gNB towards the JAB node 130-2. On the access links, the IAB donor 120 and the JAB nodes 130 may act as normal network devices, providing radio interfaces for the terminal devices 150 in their coverage areas.

BH radio link control (RLC) channel(s) can be set up between the JAB MT 131 and a DU of the parent node and an adaptation layer called a Backhaul Adaptation Protocol (BAP) is agreed to be on top of a RLC layer. The JAB DU 132 connects to the IAB donor CU 121 with an F1 interface which supports JAB functions. For example, the JAB DU 132-1 connects to the IAB donor CU 121 via the F1 interface 190 and the JAB DU 132-2 connects to the IAB donor CU 121 via the F1 interface 180. The F1 interface may comprise a F1-C interface and a F1-U interface. The JAB DU 132 connects to the JAB Donor CU-CP 123 via the F1-C interface, and the JAB DU 132 connects to the JAB Donor CU-UP 124 via the F1-U interface.

The F1 interface traffic includes the traffic of the F1-U interface (also referred to as "F1-U traffic") and the traffic of the F1-C interface (also referred to as "F1-C traffic"). The F1 interface traffic is transported on top of the adaptation layer. The JAB thus implements L2 relaying. To enable the downlink (DL) F1 traffic routed to the serving IAB donor DU 122 for the JAB node 130, the JAB node 130 is assigned with an Internet Protocol (IP) address(es) (e.g., outer IP address when IPSec tunnel is enabled) that is anchored in the IAB donor DU 122. When the IAB donor CU 121 sends the DL F1 traffic to the IAB node 130, the F1 traffic is routed to the IAB donor DU 122 based on the IP address. The IAB donor DU 122 maps the DL F1 traffic to a related BH RLC channel based on a configuration that is previously configured by the IAB donor CU 121. The configuration includes the differentiated services code point (DSCP) and/or Internet Protocol Version 6 (IPv6) Flow Label and/or IP address in order to identify the DL F1 traffic, as well as the related BH RLC channel information. This requires that the IAB donor CU 121 (e.g., donor CU-CP or donor CU-UP) uses specific DSCP and/or IPv6 Flow Label and/or IP address in order to support the traffic mapping in the IAB donor DU 122.

Moreover, during topology adaptation, the serving IAB donor DU for an JAB node 130 may be changed from a source IAB donor DU to a target IAB donor DU. Accordingly, the JAB node 130 may get a new IP address(es) that is anchored in the target IAB donor DU.

Communications in the environment 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Divided Multiple Address (CDMA), Frequency Divided Multiple Address (FDMA), Time Divided Multiple Address (TDMA), Frequency Divided Duplexer (FDD), Time Divided Duplexer (TDD), Multiple-Input Multiple-Output (MIMO), Orthogonal Frequency Divided Multiple Access (OFDMA) and/or any other technologies currently known or to be developed in the future.

In an aspect, due to possible failures on the BH connections or changes in the JAB topology or JAB mobility, an JAB node may need to change its serving node. Such change of the backhaul topology may involve the change of the parent JAB node of the JAB node or even the IAB donor. The latter case where the IAB donor is changed may be considered as Inter-Donor topology adaptation. In another aspect, topology redundancy has been proposed to enable robust operation, for example, in case of backhaul link blockage, and to balance load across backhaul links. In the scenario of Inter-Donor topology redundancy, an IAB node having a plurality of IAB DUs may have a plurality of F1 interfaces with a plurality of IAB donor CUs where an IAB DU is interfaced with a respective IAB donor CU.

Figure 2A:
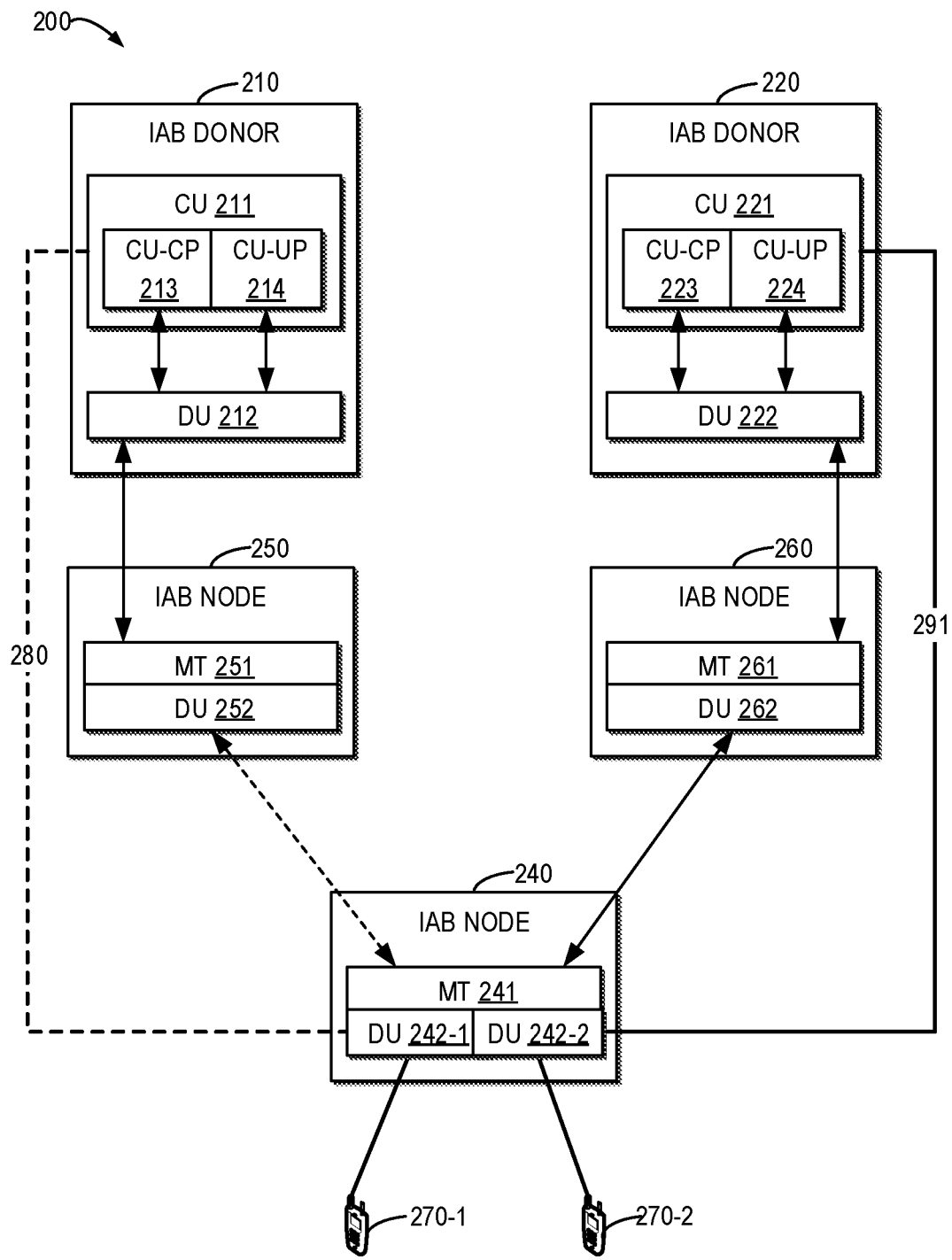
FIG. 2a and FIG. 2b illustrate example IAB environments in which embodiments of the present disclosure can be implemented.
Figure 2B:
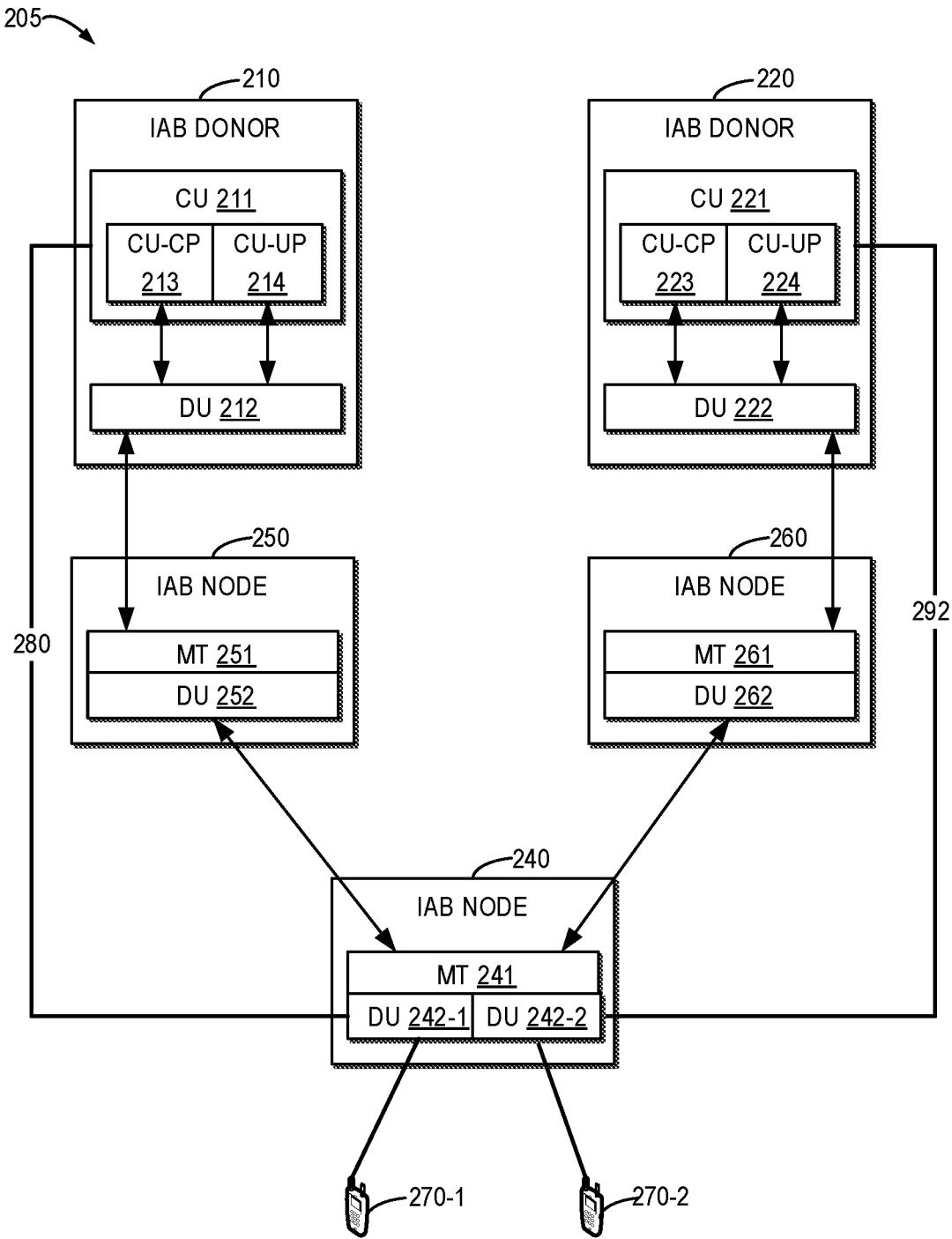

FIG. 2*a* and FIG. 2*b* illustrate example IAB environments 200 and 205 in which embodiments of the present disclosure can be implemented. As shown in FIG. 2*a* and FIG. 2*b*, the environments 200 and 205 comprise an IAB donor 210 (also referred to as "first IAB donor" or "source donor" or "donor1" in the following), an IAB donor 220 (also referred to as "second IAB donor" or "target donor" or "donor2" in the following), an IAB node 250 (also referred as "source parent cell" or "source parent"), an IAB node 260 (also referred as "target parent cell" or "target parent"), an IAB node 240 and terminal devices 270-1 and 270-2 (collectively referred to as "terminal devices 270" or individually referred to as "terminal device 270").

The IAB donor 210 comprises a CU 211 (also referred to as "IAB donor CU 211" or "donor1 CU 211" in the following) and a DU 212 (also referred to as "IAB donor DU 212" or "donor1 DU 212" in the following). The IAB donor CU 211 may comprises a CU-CP 213 also referred to as "donor1 CU-CP 213" in the following and a CU-UP 214 also referred to as "donor1 CU-UP 214" in the following.

The IAB donor 220 comprises a CU 221 (also referred to as "IAB donor CU 221" or "donor2 CU 221" in the following) and a DU 222 (also referred to as "IAB donor DU 222" or "donor2 DU 222" in the following). The IAB donor CU 221 may comprises a CU-CP 223 also referred to as "donor2 CU-CP 223" in the following and a CU-UP 224 also referred to as "donor2 CU-UP 224" in the following.

The IAB node 250, which acts as an intermediate node between the IAB donor 210 and the IAB node 240, comprises a MT 251 and a DU 252. Likewise, the IAB node 260, which acts as an intermediate node between the IAB donor 220 and the IAB node 240, comprises a MT 261 and a DU 262.

The IAB node 240 comprises a MT 241 (also referred to as "IAB MT 241" in the following) and at least one DU 242-1 (also referred to as "IAB DU 242-1" in the following). For example, as shown in FIG. 2*a*, in some example embodiments, the IAB node 240 may further comprise a DU 242-2 (also referred to as "IAB DU 242-2" in the following). The DUs 242-1 and 242-2 may be collectively referred to as "IAB DUs 242" or individually referred to as "IAB DU 242". It is to be understood that the number of DUs in the JAB node 240 shown in FIG. 2*a* and FIG. 2*b* is only for the purpose of illustration without suggesting any limitation to the scope of the present disclosure.

FIG. 2*a* shows a topology adaptation scenario. The JAB node 240 is initially connected to the JAB node 250 and thus the IAB donor 210 acts as a serving IAB donor for the JAB node 240. During a topology adaptation, the JAB node 240 migrates from the source JAB node 250 to the target JAB node 260 of a different CU. Accordingly, as shown in FIG. 2*a*, an F1 interface 280 (including the F1-C interface and the F1-U interface) between the JAB DU 242 (for example, DU 242-1) and the IAB donor CU 211 is established, and a BH link between the JAB MT 241 and the DU 252 is also established. After topology adaptation, an F1 interface 291 between the JAB DU 242 (for example, DU 242-2) and the IAB donor CU 221 is established, and a BH link between the JAB MT 241 and the DU 262 is also established.

FIG. 2b shows a topology redundancy scenario. As shown in FIG. 2b, the JAB node 240 is connected to both the JAB nodes 250 and 260 and thus the IAB donors 210 and 220 act as serving IAB donors for the JAB node 240. The F1 interface 280 between the JAB DU 242-1 and the IAB donor CU 211 is established. The BH link between the JAB MT 241 and the DU 252 is also established. An F1 interface 292 between the JAB DU 242-2 and the IAB donor CU 221 is established. The BH link between the JAB MT 241 and the DU 262 is also established. It is also possible that the JAB node 240 only have one DU, and the DU in the JAB node 240 only has the F1 interface 280 or the F1 interface 292.

It is to be understood that the number of IAB donors, JAB nodes, and terminal devices connected to the JAB nodes is only for the purpose of illustration without suggesting any limitation to the scope of the present disclosure. It is also to be understood that the number of CUs, DUs and MTs is only for the purpose of illustration without suggesting any limitation to the scope of the present disclosure. The communication system may include any suitable number of IAB donors, JAB nodes, and terminal devices adapted for implementing example embodiments of the present disclosure. For example, in some example embodiments, the JAB node 240 may be directly connected to an IAB donor, e.g., the IAB donor 210 or 220. For another example, in some example embodiments, there may be more than one intermediate JAB node between the JAB node 240 and an IAB donor, e.g., the IAB donor 210 or 220. The transmission path via the DU 212 and one or more intermediate JAB nodes (for example, JAB node 250) is referred to as a "source path". The transmission path via the DU 222 and one or more intermediate JAB nodes (for example, JAB node 260) is referred to as a "target path".

Conventionally, traffic between the CU of an IAB donor and the JAB node cannot be transmitted and routed via a DU of another IAB donor. For example, according to conventional solutions, in FIG. 2a and FIG. 2b, the traffic of F1 interface 280 could only be transmitted via the source path, and the traffic of F1 interface 291 or F1 interface 292 could only be transmitted via the target path. In the topology adaptation scenario where a serving IAB donor for an JAB node is changed from a source IAB donor to a target IAB donor, a CU of the source IAB donor cannot send its DL F1 traffic to the JAB node via the target path, i.e. via a DU of the target IAB donor, and a CU of the target IAB donor cannot send its DL F1 traffic to the JAB node via the source path, i.e. via a DU of the source IAB donor. This means only that one of the F1 interface (either F1 interface 280, or F1 interface 291/292) could be activated at any given time. Since establishment of a secure connection between the JAB node and the target IAB donor is time consuming, an interruption of connections and services at the terminal devices connected to the JAB node may be resulted. Therefore, it is desirable in topology adaptation scenario that the F1 traffic between the CU of the source IAB donor and an JAB node can be transmitted and routed via the DU of the target IAB donor, so that the JAB node can be first handed over to the target donor, setup the BH RLC channel with target parent cell, and continue the F1 traffic between the source IAB donor and JAB node routed via the target path, before the security connection is established via the target path. For example, according to some embodiments of the present disclosure, the traffic sent from IAB donor CU 211 to the JAB node 240 is routed to DU 222 and is further transmitted to the JAB node 260, by setting the target IP address of the IP header to the IAB node 240's IP address that is anchored in the DU 222. When the JAB 240 node send uplink traffic to CU 211, the traffic is sent via the target path, i.e. the traffic is sent to the intermediate JAB node 260 and is further transmitted to the DU 222, and the DU 222 then forwards the traffic to the CU 211. By using the target path for the traffic of the F1 interface 280, it enables the IAB donor CU 211 to first handover the JAB to the target donor, while the F1 traffic for the F1 interface 280 can still be transmitted via the target path. This can reduce the interruption to the UE.

According to some other embodiments of the present disclosure, the interruption may be reduced by first establishing the F1 interface 291 over the source path. The traffic for the F1 interface between the target donor and an JAB node may be transmitted over the source path, i.e. via a DU of the source donor. For example, the traffic sent from the IAB donor CU 221 to the JAB node 240 is routed to the DU 212 and is further transmitted to JAB node 240, by setting the target IP address of the IP header to the JAB node 240's IP address that is anchored in the DU 212. When the JAB 240 node send uplink traffic to the CU 221, the traffic is sent via the source path, i.e. the traffic is sent to the intermediate JAB node 250 and is further transmitted to the DU 212, and the DU 212 then forwards the traffic to CU 221. By using the source path for the F1 interface 291, it enables the IAB donor CU 211 to initiate the handover procedure for the UEs connected to the JAB node 240, while the JAB node 240 is still connected to the IAB donor 210. This allows the source donor to first handover the UEs to the target donor then handover the JAB node to the target donor, thus reducing the interruption.

In the topology redundancy scenario where an JAB node is connected to at least two IAB donor and the BH RLC channels are established between the JAB node and a source parent cell (e.g. between the JAB node 240 and the JAB node 250) and between the JAB node and a target parent cell (e.g. between the JAB node 240 and the JAB node 260), according to conventional solutions, the traffic between a CU of a first IAB donor and the JAB node cannot be transmitted and routed via a DU of a second IAB donor, and the traffic between a CU of a second IAB donor and the JAB node cannot be transmitted and routed via a DU of a first IAB donor. For example, if a path from a DU of the first IAB donor to the JAB node is blocked, the DL F1 traffic of the first IAB donor cannot be routed to the JAB node. Thus, the benefit of topology redundancy is lost. Therefore, it is desirable in topology redundancy scenario that the traffic between the CU of the first IAB donor and the JAB node can be transmitted and routed via the DU of the second IAB donor, and the traffic between the CU of the second IAB donor and the JAB node can be transmitted and routed via the DU of the first IAB donor.

Embodiments of the present disclosure provide a solution for transferring traffic in JAB communication, so as to solve the above problem and one or more of other potential problems. In this solution, a first IAB donor (e.g., a CU-CP of the first IAB donor) transmits to a second IAB donor (e.g., a CU-CP of the second IAB donor) a request to transfer target traffic via a DU of the second IAB donor. The target traffic may comprise F1 traffic between the first IAB donor and the JAB node. In some example embodiments, the target traffic may comprise F1-C traffic between the CU-CP of the first IAB donor and the JAB node. Alternatively, or in addition, in some example embodiments, the target traffic may comprise F1-U traffic between the CU-UP of the first IAB donor and the JAB node. The request comprises characteristic information of the target traffic. The first IAB donor then receives, from the second IAB donor, traffic identification information to be used for configuring the target traffic. This solution enables an IAB donor to route traffic to an JAB node via another IAB donor, for example, via a DU of the other IAB donor. In this way, this solution can improve the reliability and robustness of the JAB communication. For example, in the topology adaptation scenario, this solution can allow the UEs continuing the transmission and reception before the F1-C interface and F1-U interface are migrated to the target Donor, thus reducing the impacts on the UEs served by the migrating JAB node during an Inter-Donor topology adaptation. For another example, in the topology redundancy scenario, this solution can increase the number of available routing paths.

Figure 3:
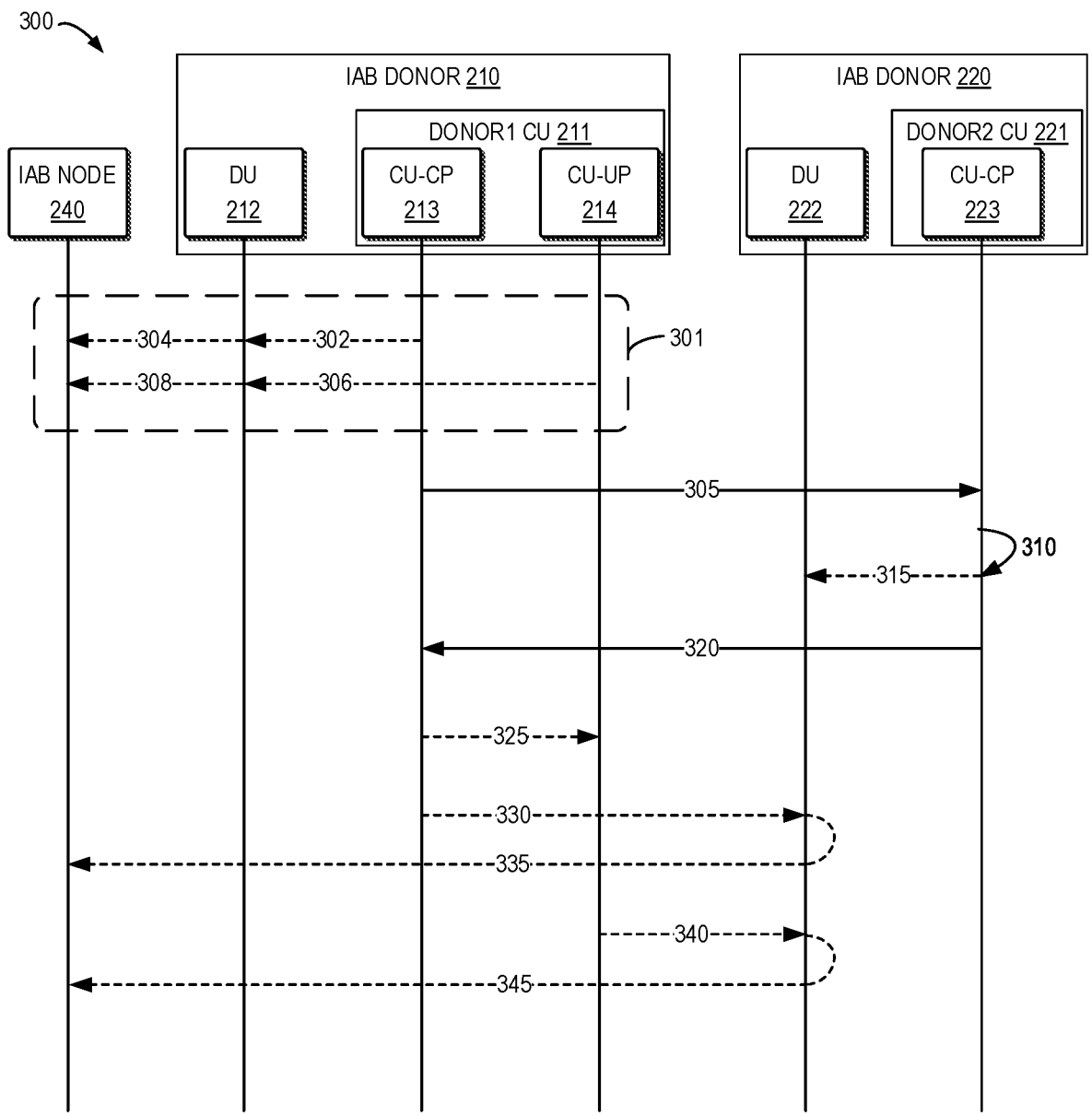
FIG. 3 illustrates a flowchart illustrating an example process for transferring traffic according to some embodiments of the present disclosure.

Some example embodiments are now detailed below. FIG. 3 illustrates a flowchart illustrating an example process 300 for transferring traffic according to some embodiments of the present disclosure. For the purpose of discussion, the process 300 will be described with reference to FIGS. 2a and 2b. The process 300 at least involves the IAB donor 210 and the IAB donor 220. In some example embodiments, the process 300 may further involve the JAB node 240.

As shown in block 301 of FIG. 3, in some example embodiments, the JAB node 240 may be initially connected to the IAB donor 210. For example, the F1 interface 280 is setup between the donor1 CU 211 and the DU 242. In this situation, F1 traffic may be transmitted from the donor1 CU 211 to the JAB node 240, e.g., the JAB DU 242 as shown in FIGS. 2a and 2b. For example, the F1-C traffic from the CU-CP 213 to the JAB DU 242 in the JAB node 240 may be routed 302 to the donor1 DU 212. The donor1 DU 212 may then perform the traffic mapping to a related BH RLC channel, and transmit 304 the F1-C traffic to the JAB DU 242 over wireless backhaul. Likewise, the F1-U traffic from the CU-UP 214 to the JAB DU 242 in the JAB node 240 may be routed 306 to the donor1 DU 212. The donor1 DU 212 may perform the traffic mapping to a related BH RLC channel, and then transmit 308 the F1-U traffic to the JAB DU 242.

In some example embodiments, for example in the topology redundancy scenario, the JAB node 240 may be connected to both the IAB donor 210 and the IAB donor 220, either directly connected to the donor DUs of IAB donor 210 and IAB donor 220, or with one or more intermediate nodes between the JAB node 240 and the donor DUs of JAB donor 210 and IAB donor 220. In this situation, the F1-C/U traffic may be transmitted from the donor1 CU 211 to the JAB node 240 and from the donor2 CU 221 to the JAB node 240.

In the example process 300, the IAB donor 210 transmits 305 to the IAB donor 220 a request to transfer target traffic of an interface between the IAB donor 210 and the JAB node 240 via the donor2 DU 222 of the IAB donor 220. The target traffic may comprise F1 traffic between the IAB donor 210 and the JAB node 240. In some example embodiments, the target traffic may comprise F1-C traffic between the CU-CP 213 of the IAB donor 210 and the JAB node 240. Alternatively, or in addition, the target traffic may comprise F1-U traffic between the CU-UP 214 of the IAB donor 210 and the JAB node 240. In the following, such a request may be referred to as a "route request" for the purpose of discussion without any limitation to the scope of the present disclosure. For example, the CU-CP 213 of the donor1 CU 211 may transmit the route request to the CU-CP 223 of the donor2 CU 221. The route request may request the IAB donor 220 to enable transferring the target traffic (e.g., F1-C/U traffic from the donor1 CU 211) to the JAB node 240 via the donor2 DU 222.

A trigger for transmitting the route request may depend on specific scenarios. In the topology adaptation scenario as shown in FIG. 2a, the JAB node 240 may migrate from the JAB node 250 to the JAB node 260. Thus, the JAB MT 241 may be going to connect to the DU 262 of the JAB node 260. In this scenario, the trigger for transmitting the route request may be a handover decision made by the donor1 CU 211, e.g., due to a load balance reason or any other reasons. In the topology redundancy scenario as shown in FIG. 2b, the JAB node 240 may be connected to both the IAB donor 210 and the IAB donor 220. In this scenario, the trigger for transmitting the route request may be establishment of the connection to the IAB donor 220. Alternatively, or in addition, the trigger for transmitting the route request may be backhaul link blockage in a route path from the IAB donor 210 to the JAB node 240 or load balance across backhaul links. It is to be understood that the above triggers are provided as examples and the scope of the present disclosure is not limited in this regard.

The route request may include identity information of the JAB node 240. For example, the route request may include an identity of the JAB MT 241.

The route request may include characteristic information (also referred to as "first information") of the target traffic to be routed. In some example embodiments, the characteristic information may include a traffic type indicating whether the target traffic comprise control plane traffic or user plane traffic. For example, the traffic type may indicate that the target traffic comprises F1-C traffic, or F1-U traffic, or traffic other than the F1-C traffic and F1-U traffic. In some other example embodiments, the traffic type may be not included or indicate that the target traffic comprises both F1-C traffic and F1-U traffic, which means that the F1-C traffic and F1-U traffic are treated in a same way. If the target traffic comprises the F1-C traffic, the traffic type may further indicate whether the F1-C traffic includes F1-C signaling associated with a UE, or F1-C signaling not associated with a UE.

Alternatively, or in addition, in some example embodiments, the characteristic information may include a Quality of Service (QoS) parameter for the target traffic. The QoS parameter may include, but not limited to, 5G QoS Identifier (5QI), priority level, Maximum Flow Bit Rate Downlink, Maximum Flow Bit Rate Uplink, Guaranteed Flow Bit Rate Downlink, Guaranteed Flow Bit Rate Uplink, packet delay budget, packet error rate, etc. If the target traffic comprises the F1-U traffic, the characteristic information may include at least one of the above QoS parameters for the F1-U traffic. The QoS parameter may also be needed for F1-C traffic.

In some example embodiments, the target traffic may be directed to at least one terminal devices in communication with the IAB node 240, for example, UEs. Accordingly, the characteristic information may further include an identity of the at least one terminal device. For example, the traffic type and/or the QoS parameter may be provided for each of the UEs and thus the characteristic information may further an identity of each of the UEs. Alternatively, or in addition, the characteristic information may further include an identity of a data radio bearer (DRB) for the at least one terminal device. For example, the traffic type and/or the QoS parameter may be provided for each DRB of a UE and thus the characteristic information may further an identity of the DRB for the UE. Similarly, the characteristic information may include an identity of a tunnel for the at least one terminal device. For example, the traffic type and/or the QoS parameter may be provided for each F1-U tunnel of a UE and thus the characteristic information may further an identity of the F1-U tunnel for the UE.

In these example embodiments, which identity(ies) of the terminal device, the DRB and the tunnel is included in the characteristic information may depend on mapping of UE-bearers to BH RLC channels. As an example, in the case of 1:1 mapping of UE-bearers to BH RLC channels, the traffic type and/or the QoS parameter may be provided for each DRB of a UE. Accordingly, the characteristic information may comprise an identity of the UE as well as an identity of each DRB or F1-U tunnel of the UE. In the following, the identity of the DRB is also referred to as a "DRB identity" and the identity of the F1-U tunnel is also referred to as a "F1-U tunnel identity".

In some example embodiments, the route request may further comprise a suggestion on transferring the target traffic. As an example, the route request may comprise a suggested value for a DSCP of the target traffic or an Internet Protocol Version 6 (IPv6) Flow Label for the target traffic, which may be provide by the donor1 CU 211. The suggested value may be a value used by the donor1 CU 211 for transmitting the same or similar type of target traffic. For example, the DSCP and/or IPv6 Flow Label are used for the F1-C traffic or F1-U traffic sent from donor1 CU 211 to the IAB node 240, that are routed via the donor1 DU 212. As another example, the route request may include other information or preference related to the QoS of the target traffic.

The route request may be implemented in any suitable manner. The route request may reuse another request. For example, the route request may be an Xn HANDOVER REQUEST message for the IAB MT 241 or an Xn S-NODE ADDITION REQUEST message. Alternatively, the route request may be a request dedicated for transferring traffic via a DU of a different IAB donor.

As shown in FIG. 3, after receiving the route request from the IAB donor 210, the IAB donor 220 (e.g., the donor2 CU 221) determines 310 traffic identification information or traffic mapping information (also referred to as "second information") based on the characteristic information of the target traffic. The traffic identification information is to be used for configuring and transferring the target traffic. For example, at least part of the traffic identification information may be incorporated by the donor1 CU 211 into an IP packet header of a F1 packet, such that the IAB donor 220 (e.g., the DU 222) can identify the F1 packet and maps the F1 packet to an appropriate BH RLC channel. After receiving the route request from the IAB donor 210, the IAB donor 220 (e.g., the donor2 CU 221) may establish the BH RLC channel(s) between the IAB node and the target parent node, for example, between IAB node 240 and IAB node 260 as shown in FIG. 2a and FIG. 2b. The establishment of the BH RLC channel(s) may consider the characteristic information of the target traffic. The establishment of the BH RLC channel(s) may also be performed early, for example, when the parent cell is added as a secondary node for the JAB node in topology redundancy scenario. The JAB node 240 is configured with the uplink traffic mapping and routing information, which is to be used to transmit the target traffic. The intermediate JAB node(s) are also configured with the traffic mapping and routing information, which is to be used to transmit/route the target traffic.

The IAB donor 220 may allocate a transport layer address for the JAB node 240. For example, the CU-CP 223 of the donor2 CU 221 may allocate an IP address to the JAB node 240. In some example embodiments, the CU-CP 223 may allocate a Backhaul Adaptation Protocol (BAP) address to be used by the JAB node 240. For example, the JAB node 240 can identify a BAP packet that needs to be terminated at the JAB node 240 by checking the BAP address of the Routing Identity part against a previously allocated BAP address. The CU-CP 223 may also allocate a routing identity to be used by traffic of a terminal device. The CU-CP 223 may also allocate a BAP path identity.

The IAB donor 220 may further allocate a DSCP for the target traffic. The DSCP for the target traffic may be allocated by the donor2 CU 221 based on the characteristic information, e.g., the QoS parameter. As an example, traffic with a QoS of #A may be allocated with a DSCP of #C and traffic with a QoS of #B may be allocated with a DSCP of #D.

Alternatively, or in addition, the IAB donor 220 may allocate a Flow Label for the target traffic, e.g., an IPv6 Flow Label for the target traffic. The Flow Label for the target traffic may be allocated by the donor2 CU 221 based on the characteristic information, e.g., the QoS parameter.

In the case of 1:1 mapping of UE-bearers to BH RLC channels, the traffic identification information may be determined for each DRB or F1-U tunnel of the terminal device. For example, the donor2 CU 221 may allocate the DSCP or the Flow Label for traffic of each DRB of a UE.

In the example embodiments where the route request comprises the suggestion on transferring the target traffic, the donor2 CU 221 may determine the traffic identification information by taking into account for the suggestion. For example, if the route request comprises a suggested DSCP for the target traffic, the donor2 CU 221 may allocate the suggested DSCP to the target traffic. Alternatively, the donor2 CU 221 may not take into account for the suggestion and determine the traffic identification information based on its own configuration. For example, the donor2 CU 221 may allocate a DSCP different from the suggested DSCP for the target traffic.

In some example embodiments, as shown in FIG. 3, upon determining the traffic identification information, the donor2 CU 221 may configure 315 the donor2 DU 222 to be prepared to route the target traffic. The donor2 CU 221 may further configure BAP routing tables for all the IAB nodes along a path from the DU 222 to the IAB node 240, for example, for the IAB nodes 240 and 260 shown in FIGS. 2a and 2b. For example, the donor2 CU 221 may transmit configuration information (also referred to as "third information") to the donor2 DU 222 for configuring the donor2 DU 222 to route the target traffic. The configuration information may at least indicate a rule of mapping the target traffic to the BH RLC channels based on the traffic identification information. As an example, the configuration information may indicate that F1 traffic with a DSCP of #E shall be mapped to the BH RLC channel #1. The configuration information may further indicate the BAP routing tables.

Continuing with the example process 300, the IAB donor 220 transmits 320 the traffic identification information to the IAB donor 210. For example, the CU-CP 223 of the donor2 CU 221 may transmit the traffic identification information to the CU-CP 213. The traffic identification information may be transmitted in a response to the route request.

The traffic identification information may include the transport layer address of the IAB node 240. For example, the traffic identification information may include an IP address of the IAB node 240 allocated by the donor2 CU 221. Alternatively, or in addition, the traffic identification information may include the BAP address of the IAB node 240 and/or a BAP path identity.

The traffic identification information may further include the DSCP for the target traffic allocated by the donor2 CU 221. Alternatively, or in addition, the traffic identification information may include the Flow Label for the target traffic, e.g., the IPv6 Flow Label for the target traffic.

In the case of 1:1 mapping of UE-bearers to BH RLC channels, the traffic identification information may be provided for each DRB or F1-U tunnel of the terminal device. For example, the DSCP or the Flow Label may be provided for traffic of each DRB of a UE. The traffic identification information may also include the identity of the terminal device, the DRB identity or the F1-U tunnel identity related to the terminal device. The traffic identification information may also include a routing identity for the terminal device.

After receiving the traffic identification information from the IAB donor 220, the IAB donor 210 may transmit the target traffic by using the traffic identification information to the JAB node 240, which is routed to the donor2 DU 222. Specifically, the donor1 CU 211 may incorporate at least part of the traffic identification information into the target traffic and transmit the target traffic to the JAB node 240, which is routed to the donor2 DU 222. The target traffic is routed to the donor2 DU 222, and is further transmitted to the JAB node 240. For example, the donor1 CU 211 may insert the DSCP and/or IPv6 Flow Label and the IP address of the JAB node 240 allocated by the donor2 CU 221 into an IP header of an IP packet including the F1 packet. The donor1 CU 211 may then transmit the IP packet including the F1 packet, which is routed to the donor2 DU 222. The donor2 DU 222 performs the traffic mapping, and transmit the IP packet including the F1 packet to the JAB node 240, for example, the JAB DU 242. In this way, F1 traffic is routed from the IAB donor 210 to the JAB node 240 via the DU 222 of the IAB donor 220.

In some example embodiments, the target traffic may comprise user plane traffic. The CU-CP 213 of the IAB donor 210 may transmit 325, to the CU-UP 214, at least part of the traffic identification information concerning the user plane traffic. The at least part of the traffic identification information concerning the user plane traffic may be referred to as "fourth information". For example, the IP address of the JAB node 240, the DSCP and/or Flow Label, the identity of the terminal device, the DRB identity or the F1-U tunnel identity for F1-U traffic may be transmitted from the CU-CP 213 to the CU-UP 214. In some other example embodiments, the CU-CP 213 of the IAB donor 210 may transmit 325, to the CU-UP 214, an update request including at least part of the traffic identification information (also referred to as "quality of service mapping information") concerning the user plane traffic to be updated. The update request indicates the old traffic identification information (or quality of service mapping information) to be updated by the new traffic identification information (or quality of service mapping information), for example, an old DSCP value to be updated by a new DSCP value, or an old IPv6 flow Label value to be updated by a new IPv6 Flow Label value. This update procedure may be initiated by the CU-CP 213, for example, when the same type of traffic is already transmitted from the CU-UP 214 to the JAB node 240 via a donor1 DU (e.g., the DU 212), and CU-CP 213 now decides to route the same type of traffic via a donor2 DU (e.g., the DU 222). Upon the reception of the update request including the traffic identification information (or quality of service mapping information), the CU-UP 214 shall replace the old traffic identification information (or quality of service mapping information) by the new traffic identification information (or quality of service mapping information) for all related user plane traffic. The CU-UP 214 then use the new traffic identification information (or quality of service mapping information) for further user plane traffic to the JAB node 240.

In these example embodiments, the CU-UP 214 of the IAB donor 210 may transmit 340 the user plane traffic by using at least part of the traffic identification information to the JAB node 240, which is routed to donor2 DU 222. The donor2 DU 222 performs the traffic mapping, and then transmit 345 the user plane traffic to the JAB node 240. The user plane traffic may comprise part of the traffic identification information. For example, the IP address of the JAB node 240 as well as the DSCP and/or Flow Label may be inserted into the IP packet header of an IP packet including the F1-U packet at the CU-UP 214. Then, the IP packet including the F1-U packet may be transmitted from the CU-UP 214 to the donor2 DU 222. The donor2 DU 222 may perform the traffic mapping, and then transmit the IP packet including the F1-U packet to the JAB node 240.

In some example embodiments, the target traffic may comprise control plane traffic. The CU-CP 213 of the IAB donor 210 may transmit 330 the control plane traffic by using at least part of the traffic identification information to the JAB node 240, which is routed to the IAB donor DU 222. The donor2 DU 222 may perform the traffic mapping, and then transmit 335 the control plane traffic to the JAB node 240. For example, the IP address of the JAB node 240 as well as the DSCP and/or Flow Label for F1-C traffic may be inserted into the IP packet header of an IP packet including the F1-C packet at the CU-CP 213. Then, the IP packet including the F1-C packet may be transmitted from the CU-CP 213 to the donor2 DU 222. The donor2 DU 222 may map the F1-C packet to a BH RLC channel, and then transmit the IP packet including the F1-C packet to the JAB node 240.

Although not shown in FIG. 3, it is to be understood that the donor2 DU 222 may transmit 335 the control plane traffic and transmit 345 the user plane traffic to the JAB node 240 via the intermediate JAB node 260 as shown in FIGS. 2a and 2b.

As can be seen from the above, in the proposed solution, both the user plane traffic and the control plane traffic from an IAB donor can be routed to an JAB node via a DU of another IAB donor. It is to be understood that the proposed solution is applicable whether the JAB node is directly or indirectly connected to the IAB donors.

In the example process 300, the donor2 CU 221 may configure 315 the donor2 DU 222 to route the target traffic upon determining the traffic identification information. In some example embodiments, the donor2 CU 221 may first transmit the traffic identification information to the donor1 CU 211, for example, to complete a handshake between the donor2 CU 221 and the donor1 CU 211. If a confirmation message is received from the donor1 CU 211, the donor2 CU 221 may configure the donor2 DU 222 to route the target traffic. If a rejection message is received from the donor1 CU 211, the donor2 CU 221 may not configure the donor2 DU 222 to route the target traffic.

In these example embodiments, the donor1 CU 211 is enabled to reject to route the target traffic via the DU 222. For example, in the topology adaptation scenario, if the reason of topology adaptation is other than mobility e.g., load balancing, the source Donor CU is enabled to reject the topology adaptation. A reason for rejecting may be that the traffic identification information received from the CU 221 supports a DSCP or QoS level lower than an acceptable DSCP or QoS level for CU 211. After the CU 211 rejects to route the target traffic via the DU 222, a new request to the CU 221 or a different node is sent. Alternatively, the JAB operation continues with the original topology e.g., if there is no radio link problem or a new trigger for the topology adaptation.

Although FIG. 3 shows acts as being performed by specific elements of the IAB donors 210 and 220, it is only for the purpose of discussion. The acts may be performed by any suitable elements of the IAB donors 210 and 220. The elements of the IAB donors 210 and 220 are shown separately in FIGS. 2*a*, 2*b* and 3 for the purpose of illustration without any limitation to the scope of the present disclosure. In some example embodiments, two or more of these elements may be implemented by a same device or apparatus. For example, the DU 222 and the CU 221 of the IAB donor 220 may be implemented by a same device or apparatus. For another example, the CU-CP 213 and the CU-UP 214 of the IAB donor 210 may be implemented by a same device or apparatus.

Figure 4:
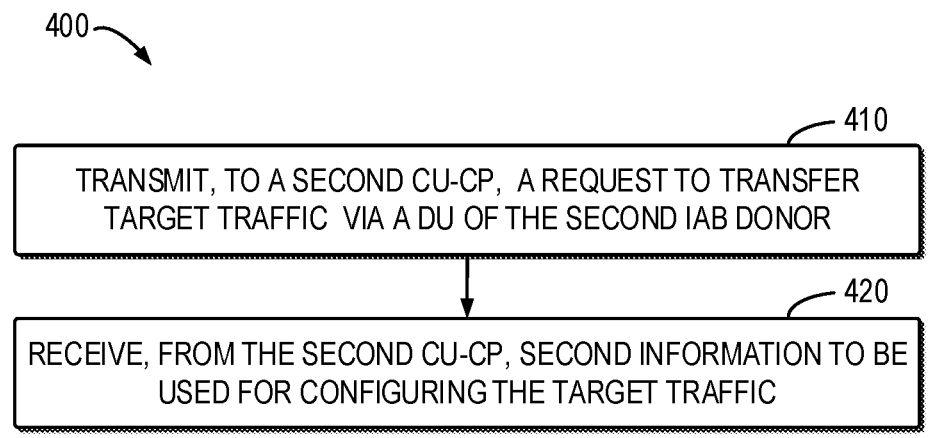
FIG. 4 illustrates a flowchart of an example method according to some example embodiments of the present disclosure.

FIG. 4 shows a flowchart of an example method 400 for JAB communication in accordance with some example embodiments of the present disclosure. The method 400 can be implemented at any suitable device. For example, the method 400 can be implemented at the CU-CP 213 of the IAB donor 210 shown in FIG. 2*a* and/or FIG. 2*b*. For the purpose of discussion, the method 400 will be described with reference to FIG. 2*a* and/or FIG. 2*b*. In the following, the CU-CP 213 of the IAB donor 210 is also referred to as a "first CU-CP 213", and the CU-CP 223 of the IAB donor 220 is also referred to as a "second CU-CP 214". It is to be understood that the method 400 may include additional blocks not shown and/or may omit some shown blocks, and the scope of the present disclosure is not limited in this regard.

At block 410, the first CU-CP 213 transmits, to a second CU-CP 214, a request to transfer target traffic of an interface between a first IAB donor 210 and an JAB node 240 via a DU 222 of the second IAB donor 220. The request comprises first information of the target traffic.

In some example embodiments, the first information comprises at least one of: a traffic type indicating whether the target traffic comprises user plane traffic or control plane traffic, or a Quality of Service parameter for the target traffic.

In some example embodiments, the target traffic is directed to at least one device (for example, at least one UE) in communication with the JAB node 240, and the first information further comprises at least one of: an identity of the at least one device, an identity of a data radio bearer for the at least one device, or an identity of a user plane tunnel for the at least one device.

At block 420, the first CU-CP 213 receives, from the second CU-CP 214, second information to be used for configuring the target traffic, in order to be routed via the DU 222.

In some example embodiments, the second information comprises at least one of: a differentiated services code point for the target traffic, a IPv6 Flow Label for the target traffic, a transport layer address of the JAB node 240, a Backhaul Adaptation Protocol (BAP) address of the JAB node 240, a BAP path identity, an identity of at least one device (for example, at least one UE) in communication with the JAB node 240, an identity of a data radio bearer for the at least one device, an identity of a user plane tunnel for the at least one device, or a routing identity for the at least one terminal device.

In some example embodiments, the target traffic comprises user plane traffic of an interface between a CU-UP 214 of the first IAB donor 210 and the JAB node 240. The first CU-CP 213 transmits, to the CU-UP 214, at least part of the second information concerning the user plane traffic.

In some example embodiments, the target traffic comprises control plane traffic of an interface between the first CU-CP 213 and the JAB node 240. The first CU-CP 213 transmits to the JAB node 240 via the DU 222 of the second IAB donor 220, the control plane traffic comprising at least part of the second information. In some example embodiments, prior to transmitting the control plane traffic, the first CU-CP 213 uses the at least part of the second information to configure a packet header of the control plane traffic.

Figure 5A:
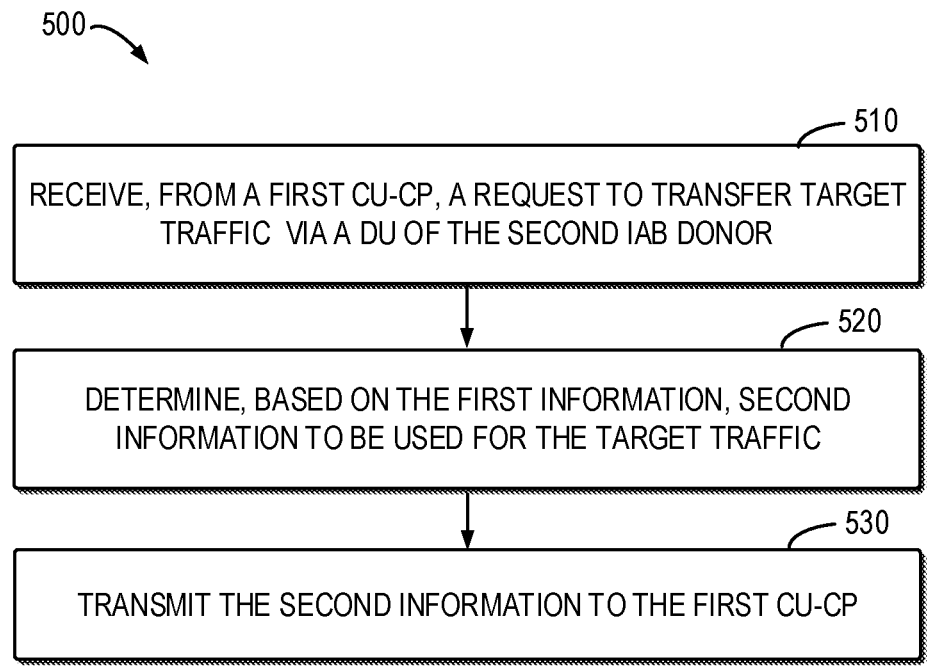
FIG. 5a illustrates a flowchart of an example method according to some example embodiments of the present disclosure.

FIG. 5*a* shows a flowchart of an example method 500 for JAB communication in accordance with some example embodiments of the present disclosure. The method 500 can be implemented at any suitable device. For example, the method 500 can be implemented at the CU-CP 223 of the IAB donor 220 as shown in FIG. 2*a* and/or FIG. 2*b*. For the purpose of discussion, the method 500 will be described with reference to FIG. 2*a* and/or FIG. 2*b*. In the following, the CU-CP 213 of the IAB donor 210 is also referred to as a "first CU-CP 213", and the CU-CP 223 of the IAB donor 220 is also referred to as a "second CU-CP 214". It is to be understood that the method 500 may include additional blocks not shown and/or may omit some shown blocks, and the scope of the present disclosure is not limited in this regard.

At block 510, the second CU-CP 223 receives, from a first CU-CP 213, a request to transfer target traffic of an interface between a first IAB donor 210 and an JAB node 240 via a DU 222 of the second IAB donor 220. The request comprises first information of the target traffic.

In some example embodiments, the first information comprises at least one of: a traffic type indicating whether the target traffic comprises user plane traffic or control plane traffic, or a Quality of Service parameter for the target traffic.

In some example embodiments, the target traffic is directed to at least one device (for example, at least one UE) in communication with the JAB node 240, and the first information further comprises at least one of: an identity of the at least one device, an identity of a data radio bearer for the at least one device, or an identity of a user plane tunnel for the at least one device.

At block 520, the second CU-CP 223 determines, based on the first information, second information to be used for the target traffic.

In some example embodiments, the second information comprises at least one of: a differentiated services code point for the target traffic, an IPv6 Flow Label for the target traffic, a transport layer address of the JAB node 240, a BAP address of the JAB node 240, a BAP path identity, an identity of at least one device (for example, at least one UE) in communication with the JAB node 240, an identity of a data radio bearer for the at least one device, an identity of a user plane tunnel for the at least one device, or a routing identity for the at least one device.

At block 530, the second CU-CP 223 transmits the second information to the first CU-CP 213.

In some example embodiments, the second CU-CP 223 transmits, to the DU 222 of the second IAB donor 220, third information for configuring the DU 222 of the second IAB donor 220 to perform traffic mapping and route the target traffic to the JAB node 240.

Figure 5B:
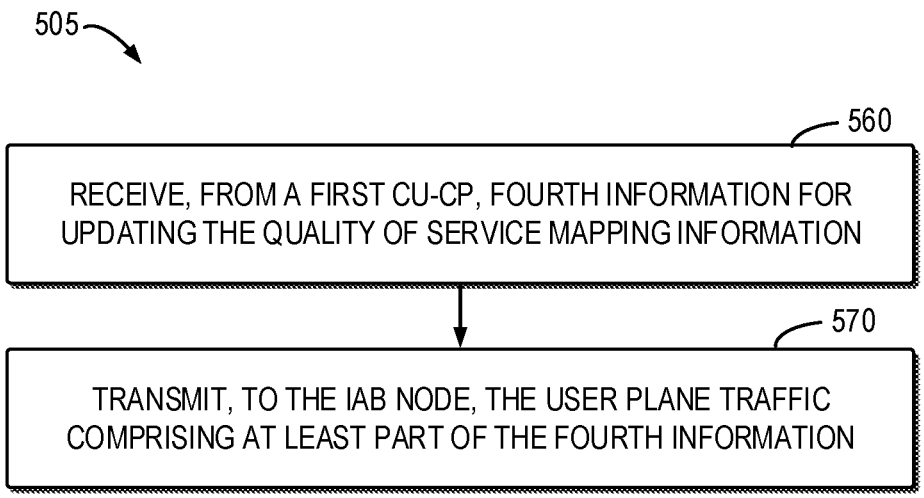
FIG. 5b illustrates a flowchart of an example method according to some example embodiments of the present disclosure.

FIG. 5*b* shows a flowchart of an example method 505 for JAB communication in accordance with some example embodiments of the present disclosure. The method 505 can be implemented at any suitable device. For example, the method 505 can be implemented at the CU-UP 214 of the IAB donor 210 as shown in FIG. 2a and/or FIG. 2b. For the purpose of discussion, the method 505 will be described with reference to FIG. 2a and/or FIG. 2b. In the following, the CU-CP 213 of the IAB donor 210 is also referred to as a "first CU-CP 213", and the CU-CP 223 of the IAB donor 220 is also referred to as a "second CU-CP 214". It is to be understood that the method 505 may include additional blocks not shown and/or may omit some shown blocks, and the scope of the present disclosure is not limited in this regard.

At block 560, the CU-UP 214 receives from a CU-CP 213, fourth information for updating quality of service mapping information for user plane traffic of an interface between the CU-UP 214 and an JAB node 240. The user plane traffic is to be transferred to the JAB node 240.

In some example embodiments, the fourth information comprises at least one of: a first differentiated services code point used by the CU-UP 214 for the user plane traffic, a first IPv6 Flow Label used by the CU-UP 214 for the user plane traffic, a second differentiated services code point to be used by the CU-UP 214 for the user plane traffic, a second IPv6 Flow Label to be used by the CU-UP 214 for the user plane traffic, a transport layer address of the JAB node 240, a BAP address of the JAB node, a BAP path identity, an identity of at least one device (for example, at least one UE) in communication with the JAB node 240, an identity of a data radio bearer for the at least one device, an identity of a user plane tunnel for the at least one device, or a routing identity for the at least one device.

At block 570, the CU-UP 214 transmits, to the IAB node 240 for example via a distributed Unit (DU) of the first IAB donor or a second IAB donor, the user plane traffic comprising at least part of the fourth information.

In some example embodiments, prior to transmitting the user plane traffic, the CU-UP 214 updates the quality of service mapping information using the at least part of the fourth information. The CU-UP 214 configures a packet header of the user plane traffic with the updated quality of service mapping information.

In some example embodiments, a first apparatus capable of performing the method 400 (for example, the CU-CP 213) may comprise means for performing the respective operations of the method 400. The means may be implemented in any suitable form. For example, the means may be implemented in a circuitry or software module. The first apparatus may be implemented as or included in the CU-CP 213.

In some example embodiments, the first apparatus comprises: means for transmitting, at a first CU-CP of a first IAB donor to a second CU-CP of a second IAB donor, a request to transfer target traffic via a DU of the second IAB donor, the request comprising first information of the target traffic; means for receiving, from the second CU-CP, second information to be used for configuring the target traffic.

In some example embodiments, the target traffic comprises user plane traffic of an interface between a CU-UP of the first IAB donor and an IAB node and the first apparatus further comprises: means for transmitting, to the CU-UP, at least part of the second information concerning the user plane traffic.

In some example embodiments, the target traffic comprises control plane traffic of an interface between the first CU-CP and an IAB node and the first apparatus further comprises: means for transmitting, to the IAB node via the DU of the second IAB donor, the control plane traffic comprising at least part of the second information. In some example embodiments, the first apparatus further comprises: means for prior to transmitting the control plane traffic, using the at least part of the second information to configure a packet header of the control plane traffic.

In some example embodiments, the first information comprises at least one of: a traffic type indicating whether the target traffic comprises user plane traffic or control plane traffic, or a Quality of Service parameter for the target traffic. In some example embodiments, the target traffic is directed to at least one device in communication with an IAB node, and the first information further comprises at least one of: an identity of the at least one device, an identity of a data radio bearer for the at least one device, or an identity of a user plane tunnel for the at least one device.

In some example embodiments, the second information comprises at least one of: a differentiated services code point for the target traffic, an IPv6 Flow Label for the target traffic, a transport layer address of an IAB node, a BAP address of the IAB node, a BAP path identity, an identity of at least one device in communication with the IAB node, an identity of a data radio bearer for the at least one device, an identity of a user plane tunnel for the at least one device, or a routing identity for the at least one device.

In some example embodiments, a second apparatus capable of performing the method 500 (for example, the CU-CP 223) may comprise means for performing the respective operations of the method 500. The means may be implemented in any suitable form. For example, the means may be implemented in a circuitry or software module. The first apparatus may be implemented as or included in the CU-CP 223.

In some example embodiments, the second apparatus comprises: means for receiving, at a second CU-CP of a second IAB from a first CU-CP of a first IAB donor, a request to transfer target traffic via a DU of the second IAB donor, the request comprising first information of the target traffic; means for determining, based on the first information, second information to be used for the target traffic; and means for transmitting the second information to the first CU-CP.

In some example embodiments, the first information comprises at least one of: a traffic type indicating whether the target traffic comprises user plane traffic or control plane traffic, or a Quality of Service parameter for the target traffic. In some example embodiments, the target traffic is directed to at least one device in communication with an IAB node, and the first information further comprises at least one of: an identity of the at least one device, an identity of a data radio bearer for the at least one device, or an identity of a user plane tunnel for the at least one device.

In some example embodiments, the second information comprises at least one of: a differentiated services code point for the target traffic, an IPv6 Flow Label for the target traffic, a transport layer address of an IAB node, a BAP address of the IAB node, a BAP path identity, an identity of at least one device in communication with the IAB node, an identity of a data radio bearer for the at least one device, an identity of a user plane tunnel for the at least one device, or a routing identity for the at least one device.

In some example embodiments, the second apparatus further comprises means for transmitting, to the DU of the second IAB donor, third information for configuring the DU of the second IAB donor to perform traffic mapping and route the target traffic to the IAB node.

In some example embodiments, a third apparatus capable of performing the method 505 (for example, the CU-UP 214) may comprise means for performing the respective operations of the method 505. The means may be implemented in any suitable form. For example, the means may be implemented in a circuitry or software module. The first apparatus may be implemented as or included in the CU-UP 214.

In some example embodiments, the third apparatus comprises: means for receiving, at a CU-UP of a first IAB donor from a first CU-CP of the first IAB donor, fourth information for updating quality of service mapping information for user plane traffic of an interface between the CU-UP and an IAB node, the user plane traffic to be transferred to the IAB node; and means for transmitting, to the IAB node, the user plane traffic comprising at least part of the fourth information.

In some example embodiments, the third apparatus further comprises: means for prior to transmitting the user plane traffic, updating the quality of service mapping information using the at least part of the fourth information; and means for configuring a packet header of the user plane traffic with the updated quality of service mapping information.

In some example embodiments, the fourth information comprises at least one of: a first differentiated services code point used by the CU-UP for the user plane traffic, a first Internet Protocol Version 6 (IPv6) Flow Label used by the CU-UP for the user plane traffic, a second differentiated services code point to be used by the CU-UP for the user plane traffic, a second Internet Protocol Version 6 (IPv6) Flow Label to be used by the CU-UP for the user plane traffic, a transport layer address of the IAB node, a Backhaul Adaptation Protocol (BAP) address of the IAB node, a Backhaul Adaptation Protocol (BAP) path identity, an identity of at least one device in communication with the IAB node, an identity of a data radio bearer for the at least one device, an identity of a user plane tunnel for the at least one device, or a routing identity for the at least one device.

Figure 6:
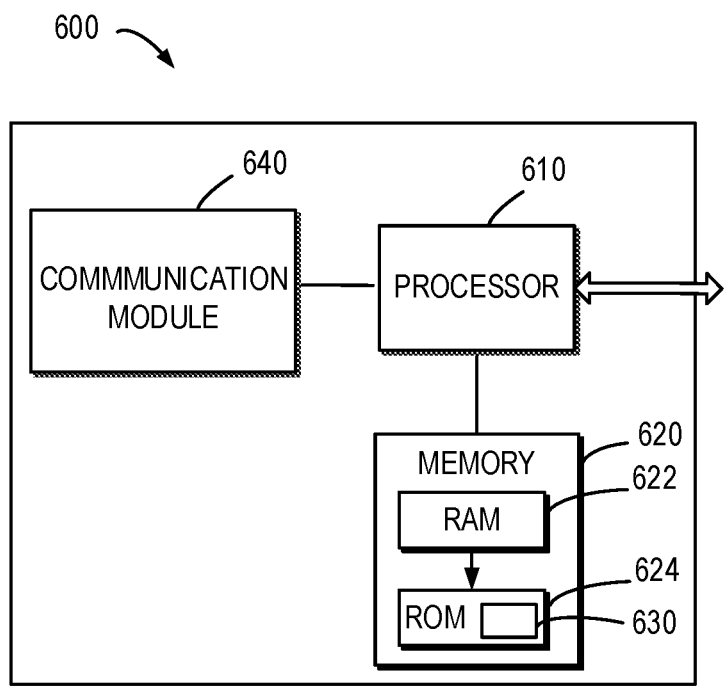
FIG. 6 illustrates a simplified block diagram of an apparatus that is suitable for implementing embodiments of the present disclosure.

FIG. 6 is a simplified block diagram of a device 600 that is suitable for implementing embodiments of the present disclosure. For example, the IAB node 240, the IAB donor 210, the IAB donor 220, CU-CP 213, CU-UP 214, CU 211, CU-CP 223, CU 221, DU 222 shown in FIG. 2a and/or FIG. 2b can be implemented by the device 600. As shown, the device 600 includes one or more processors 610, one or more memories 620 coupled to the processor 610, and one or more communication modules 640 coupled to the processor 610.

The communication module 640 is for bidirectional communications. The communication module 640 has at least one antenna to facilitate communication. The communication interface may represent any interface that is necessary for communication with other network elements.

The processor 610 may be of any type suitable to the local technical network and may include one or more of the following: general purpose computers, special purpose computers, microprocessors, digital signal processors (DSPs) and processors based on multicore processor architecture, as non-limiting examples. The device 600 may have multiple processors, such as an application specific integrated circuit chip that is slaved in time to a clock which synchronizes the main processor.

The memory 620 may include one or more non-volatile memories and one or more volatile memories. Examples of the non-volatile memories include, but are not limited to, a Read Only Memory (ROM) 624, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 622 and other volatile memories that will not last in the power-down duration.

A computer program 630 includes computer executable instructions that are executed by the associated processor 610. The program 630 may be stored in the ROM 624. The processor 610 may perform any suitable actions and processing by loading the program 630 into the RAM 622.

The embodiments of the present disclosure may be implemented by means of the program 630 so that the device 600 may perform any process of the disclosure as discussed with reference to FIGS. 3-5. The embodiments of the present disclosure may also be implemented by hardware or by a combination of software and hardware.

Figure 7:
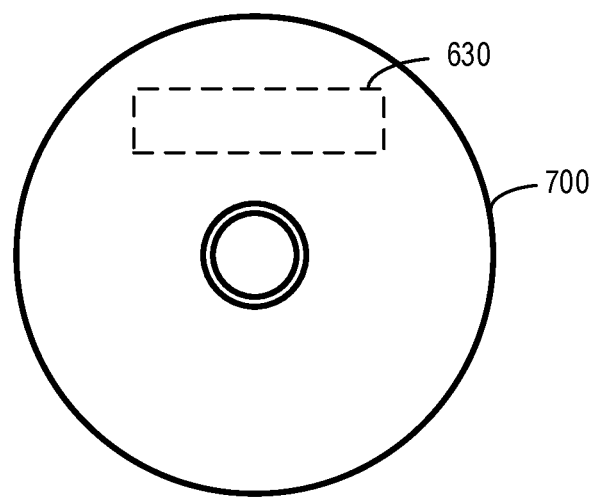
FIG. 7 illustrates a block diagram of an example computer readable medium in accordance with some example embodiments of the present disclosure.

In some example embodiments, the program 630 may be tangibly contained in a computer readable medium which may be included in the device 600 (such as in the memory 620) or other storage devices that are accessible by the device 600. The device 600 may load the program 630 from the computer readable medium to the RAM 622 for execution. The computer readable medium may include any types of tangible non-volatile storage, such as ROM, EPROM, a flash memory, a hard disk, CD, DVD, and the like. FIG. 7 shows an example of the computer readable medium 700 in form of CD or DVD. The computer readable medium has the program 630 stored thereon.

It should be appreciated that future networks may utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications, this may mean node operations to be carried out, at least partly, in a central/centralized unit, CU, (e.g. server, host or node) operationally coupled to distributed unit, DU, (e.g. a radio head/node). It is also possible that node operations will be distributed among a plurality of servers, nodes or hosts. It should also be understood that the distribution of labour between core network operations and base station operations may vary depending on implementation.

In an embodiment, the server may generate a virtual network through which the server communicates with the distributed unit. In general, virtual networking may involve a process of combining hardware and software network resources and network functionality into a single, software-based administrative entity, a virtual network. Such virtual network may provide flexible distribution of operations between the server and the radio head/node. In practice, any digital signal processing task may be performed in either the CU or the DU and the boundary where the responsibility is shifted between the CU and the DU may be selected according to implementation.

Therefore, in an embodiment, a CU-DU architecture is implemented. In such case the device 600 may be comprised in a central unit (e.g. a control unit, an edge cloud server, a server) operatively coupled (e.g. via a wireless or wired network) to a distributed unit (e.g. a remote radio head/node). That is, the central unit (e.g. an edge cloud server) and the distributed unit may be stand-alone apparatuses communicating with each other via a radio path or via a wired connection. Alternatively, they may be in a same entity communicating via a wired connection, etc. The edge cloud or edge cloud server may serve a plurality of distributed units or a radio access networks. In an embodiment, at least some of the described processes may be performed by the central unit. In another embodiment, the device 600 may be instead comprised in the distributed unit, and at least some of the described processes may be performed by the distributed unit.

In an embodiment, the execution of at least some of the functionalities of the device 600 may be shared between two physically separate devices (DU and CU) forming one operational entity. Therefore, the apparatus may be seen to depict the operational entity comprising one or more physically separate devices for executing at least some of the described processes. In an embodiment, such CU-DU architecture may provide flexible distribution of operations between the CU and the DU. In practice, any digital signal processing task may be performed in either the CU or the DU and the boundary where the responsibility is shifted between the CU and the DU may be selected according to implementation. In an embodiment, the device 1000 controls the execution of the processes, regardless of the location of the apparatus and regardless of where the processes/functions are carried out.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 400 as described above with reference to FIG. 4, the method 500 as described above with reference to FIG. 5a, and the method 505 as described above with reference to FIG. 5b. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. An apparatus comprising:
   at least one processor; and
   at least one memory storing instructions that, when executed by the at least one processor, cause the apparatus at least to:
   transmit, at a first Central Unit-Control Plane (CU-CP) of a first Integrated Access and Backhaul (IAB) donor to a second CU-CP of a second IAB donor, a request to transfer target traffic via a Distributed Unit (DU) of the second IAB donor, the request comprising first information of the target traffic; and
   receive, from the second CU-CP, second information to be used for configuring the target traffic.

2. The apparatus of claim 1, wherein the target traffic comprises user plane traffic of an interface between a Central Unit-User Plane (CU-UP) of the first IAB donor and an IAB node, wherein the apparatus is caused to:
   transmit, to the CU-UP, at least part of the second information concerning the user plane traffic.

3. The apparatus of claim 1, wherein the target traffic comprises control plane traffic of an interface between the first CU-CP and an IAB node, wherein the apparatus is caused to:
 transmit, to the IAB node via the DU of the second IAB donor, the control plane traffic comprising at least part of the second information.

4. The apparatus of claim 3, wherein the apparatus is caused to:
 prior to transmitting the control plane traffic, use the at least part of the second information to configure a packet header of the control plane traffic.

5. The apparatus of claim 1, wherein the first information comprises at least one of:
 a traffic type indicating whether the target traffic comprises user plane traffic or control plane traffic, or
 a quality of service parameter for the target traffic.

6. The apparatus of claim 5, wherein the target traffic is directed to at least one device in communication with an IAB node, and the first information further comprises at least one of:
 an identity of the at least one device,
 an identity of a data radio bearer for the at least one device, or
 an identity of a user plane tunnel for the at least one device.

7. The apparatus of claim 1, wherein the second information comprises at least one of:
 a differentiated services code point for the target traffic,
 an Internet Protocol Version 6 Flow Label for the target traffic,
 a transport layer address of an IAB node,
 a Backhaul Adaptation Protocol address of the IAB node,
 a Backhaul Adaptation Protocol path identity,
 an identity of at least one device in communication with the IAB node,
 an identity of a data radio bearer for the at least one device,
 an identity of a user plane tunnel for the at least one device, or
 a routing identity for the at least one device.

8. An apparatus comprising:
 at least one processor; and
 at least one memory storing instructions that, when executed by the at least one processor, cause the apparatus at least to:
 receive, at a second Central Unit-Control Plane (CU-CP) of a second Integrated Access and Backhaul (IAB) donor from a first CU-CP of a first IAB donor, a request to transfer target traffic via a Distributed Unit (DU) of the second IAB donor, the request comprising first information of the target traffic;
 determine, based on the first information, second information to be used for the target traffic; and
 transmit the second information to the first CU-CP.

9. The apparatus of claim 8, wherein the first information comprises at least one of:
 a traffic type indicating whether the target traffic comprises user plane traffic or control plane traffic, or
 a quality of service parameter for the target traffic.

10. The apparatus of claim 9, wherein the target traffic is directed to at least one device in communication with an IAB node, and the first information further comprises at least one of:
 an identity of the at least one device,
 an identity of a data radio bearer for the at least one device, or
 an identity of a user plane tunnel for the at least one device.

11. The apparatus of claim 8, wherein the second information comprises at least one of:
 a differentiated services code point for the target traffic,
 an Internet Protocol Version 6 Flow Label for the target traffic,
 a transport layer address of an IAB node,
 a Backhaul Adaptation Protocol address of the IAB node,
 a Backhaul Adaptation Protocol path identity,
 an identity of at least one device in communication with the IAB node,
 an identity of a data radio bearer for the at least one device,
 an identity of a user plane tunnel for the at least one device, or
 a routing identity for the at least one device.

12. The apparatus of claim 8, wherein the apparatus is caused to:
 transmit, to the DU of the second IAB donor, third information for configuring the DU of the second IAB donor to perform traffic mapping and route the target traffic to an IAB node.

13. An apparatus comprising:
 at least one processor; and
 at least one memory storing instructions that, when executed by the at least one processor, cause the apparatus at least to:
 receive, at a Central Unit-User Plane (CU-UP) of a first Integrated Access and Backhaul (IAB) donor from a first Central Unit-Control Plane (CU-CP) of the first IAB donor, fourth information for updating quality of service mapping information for user plane traffic of an interface between the CU-UP and an IAB node, the user plane traffic to be transferred to the IAB node; and
 transmit, to the IAB node, the user plane traffic comprising at least part of the fourth information.

14. The apparatus of claim 13, wherein the apparatus is caused to:
 prior to transmitting the user plane traffic, update the quality of service mapping information using the at least part of the fourth information; and
 configure a packet header of the user plane traffic with the updated quality of service mapping information.

15. The apparatus of claim 13, wherein the fourth information comprises at least one of:
 a first differentiated services code point used by the CU-UP for the user plane traffic,
 a first Internet Protocol Version 6 Flow Label used by the CU-UP for the user plane traffic,
 a second differentiated services code point to be used by the CU-UP for the user plane traffic,
 a second Internet Protocol Version 6 Flow Label to be used by the CU-UP for the user plane traffic,
 a transport layer address of the IAB node,
 a Backhaul Adaptation Protocol address of the IAB node,
 a Backhaul Adaptation Protocol path identity,
 an identity of at least one device in communication with the IAB node,
 an identity of a data radio bearer for the at least one device,
 an identity of a user plane tunnel for the at least one device, or
 a routing identity for the at least one device.

* * * * *